United States Patent [19]

Fox

[11] 4,262,933
[45] Apr. 21, 1981

[54] PASSIVE SEAT BELT SYSTEM WITH DAMPENING MEANS

[75] Inventor: William R. Fox, Warren, Mich.

[73] Assignee: Allied Chemical Corporation, Morris Township, Morris County, N.J.

[21] Appl. No.: 89,653

[22] Filed: Oct. 29, 1979

[51] Int. Cl.³ .............................................. B60R 21/02
[52] U.S. Cl. ................... 280/802; 280/803; 280/807; 280/808; 242/107.3
[58] Field of Search ............... 280/802, 803, 806, 807, 280/808; 242/107.3; 180/286

[56] References Cited

U.S. PATENT DOCUMENTS

| | | | |
|---|---|---|---|
| 3,743,319 | 7/1973 | Winchell | 280/807 |
| 3,865,397 | 2/1974 | Pilhall | 280/803 |
| 4,065,072 | 12/1977 | Magyar | 280/807 |

Primary Examiner—Robert R. Song
Attorney, Agent, or Firm—Roger H. Criss

[57] ABSTRACT

A dampening device is provided for a seat retractor associated with a passive seat belt system to reduce the rewind speed of the webbing in response to closing of a door of the vehicle. The dampening device is inoperable when the door is opened. The seat belt webbing may be maintained in a non-restraining position and automatically released to its restraining position under a slow rewind speed in response to a condition indicating that the vehicle is operable for locomotion. The dampening device may alternatively be actuated in response to a condition indicating that the vehicle is operable for locomotion.

10 Claims, 3 Drawing Figures

PASSIVE SEAT BELT SYSTEM WITH DAMPENING MEANS

BACKGROUND OF THE INVENTION

1. Field of the Invention.

This invention relates to vehicle passive seat belt restraint systems.

2. Description of the Prior Art.

Various passive seat belt systems have heretofore been suggested to automatically position either a single diagonal belt or combined lap and shoulder belts about a vehicle occupant. Typically, one end of the seat webbing is attached to a door adjacent a seat in the vehicle and the other end is attached on the inboard side of the seat, with at least one of the ends being attached to a seat belt retractor for storing and permitting extension of the webbing. For example, one end of the webbing may be attached to a door through a fixed anchor and the other end of the webbing attached to an inboard emergency locking retractor.

One of the problems associated with such previous systems is that the retractor rewind springs are relatively strong due to the increased amount of webbing associated with the system as compared with a conventional active seal belt system. As a result, after the webbing has been partially retracted, it is taken up at a relatively high speed which may be objectionable or even injurious to the occupant. It has been proposed to alieviate such problem by including a device which slows down the rewind speed of the webbing. However, with such design it is possible for the webbing to get caught in the door as the door is being closed due to the decreased rewind speed.

It would be desirable to provide a passive seat belt system which rectifies the above-mentioned problems.

SUMMARY OF THE INVENTION

In accordance with this invention, there is provided a vehicle passive seat belt system comprising:
  seat belt webbing adapted to be automatically positioned about a vehicle occupant;
  seat belt retractor means connected to said webbing;
  rewind means associated with said retractor means and exerting a rewind force on said webbing whereby said webbing is normally taken up by said retractor at a rewind speed within a first range;
  dampening means associated with said rewind means and movable between an operable position and an inoperable position, said dampening means being effective in its operable position to cause the webbing to be taken up by the retractor at a rewind speed within a second range which is lower than the first range, the dampening means being ineffective in its inoperable position to reduce the rewind speed of the webbing; and
  actuator means effective to move the dampening means to its operable position in response to closing of a door of the vehicle or to a condition indicating that the vehicle is operable for locomotion.

The dampening means may be a friction clutch arrangement attached to the shaft of the retractor means. With movement of the actuator means to its operable position in response to an operable indicating condition of the vehicle, such as movement of the gear selector out of the park position or release of the emergency brake, the dampening means becomes effective to slow down the rewind speed of the webbing. Thus, the webbing may be taken up at its full rewind speed as the door is being closed, but after the door is closed and the stated condition sensed, the webbing is slowly returned to its fully stored position. This invention is particularly useful in passive seat belt systems in which a remote hook or similar device is used to keep the webbing away from the occupant or an articulation device is employed to keep the webbing away from the occupant.

DESCRIPTION OF THE PREFERRED EMBODIMENTS

Figure 1:
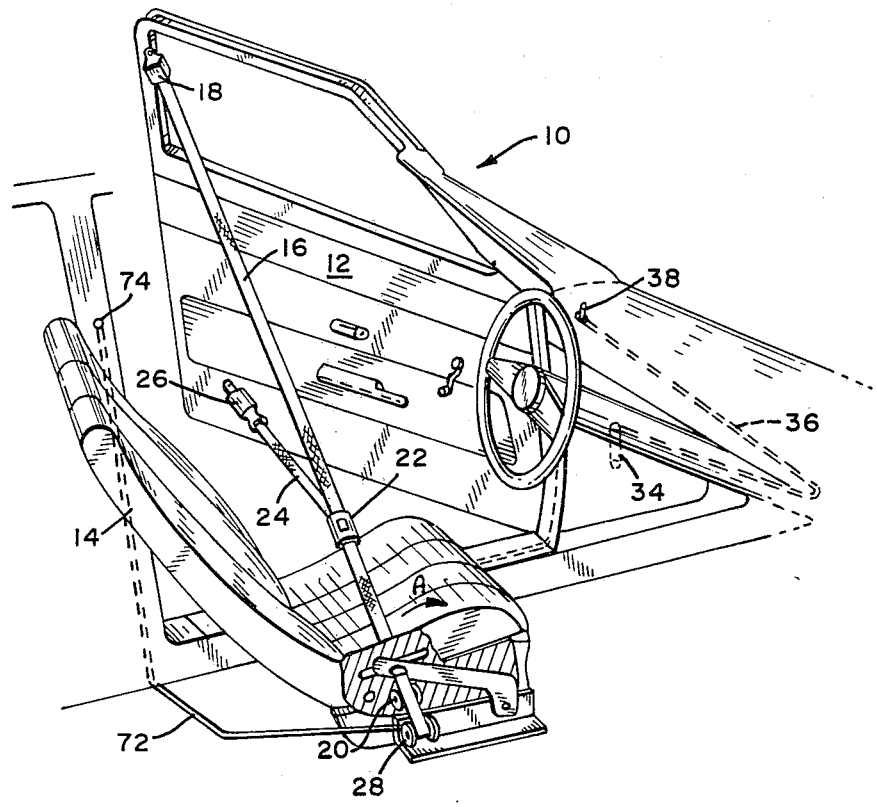
FIG. 1 is a view of the passive seat belt system of this invention.

As pointed out above, the present invention is particularly suitable for use with a passive seat belt system wherein a hook or articulation device is used to keep the webbing away from the occupant. One of such systems is shown in FIG. 1 and is more fully described in U.S. Pat. application Ser. No. 62,082 filed July 30, 1979, the disclosure of which is expressly incorporated herein by reference. It is to be understood that the present invention may be employed in other passive seat belt systems.

With reference to FIG. 1, there is shown a passive seat belt system, generally indicated at 10, in a vehicle which includes a door 12 and a seat 14. A torso belt 16 has one end mounted to door 12 through an anchor 18 and its other end connected to a retractor 20 located on the inboard side of seat 14. Torso belt 16 extends, through an intermediate portion thereof, through a guide clip 22 as described below. A separate lap belt 24 has one end mounted to door 12 through anchor 26 and its other end connected to a retractor 28 also located on the inboard side of seat 14. Retractors 20 and 28 are preferably of the emergency locking type and may be housed in a single frame attached to the vehicle seat 14, to a console adjacent to seat 14 inboard of door 12 or to the vehicle floor. Preferably, anchors 18 and 26 are in the form of seat belt buckle and tongue assemblies which may be utilized for emergency release of the passive seat belt system. Alternatively, retractors 20 and 28 may be provided with a release mechanism to permit free spooling and thereby provide an emergency release from the system.

A junction means in the form of a guide clip 22 may be secured to lap belt 24 intermediate the latter's ends in order to space the belts. Such a clip is dislcosed in the aforementioned patent application and may include a manual tension relieving device as is disclosed in U.S. Pat. application Ser. No. 62,276, filed July 30, 1979, the disclosure of which is expressly incorporated herein by reference.

In order to provide a larger area to facilitate ingress to and egress from the vehicle, one or more hooks 38 is provided on the dashboard or other area of the vehicle. Hooks 38 are adapted to receive seat belts 16 and 24. Belts 16 and 24 may be manually moved forward and placed into a stored position on hook 38 prior to exiting the vehicle. Guide clip 22 facilitates movement of the belts as a unit. An automatic releasing mechanism may be provided to free the seat belts from hooks 38. For example, hooks 38 may be moved upon actuation to a downward position whereby the belts are no longer maintained in their stored position. Such actuation may result from the occupant moving gear shift selector 34 out of the "park" or into the "drive" position as would occur prior to moving the vehicle, with mechanical interconnect means shown as cable 36 being provided between gear shift selector 34 and hook 38. Alternatively, cable 36 may connect hook 38 with the emergency brake release or similar device in such vehicle.

Torso belt 16 and lap belt 24 may be moved to their restraining and non-restraining positions by means of an automatic articulation device as shown in U.S. Pat. application Ser. No. 62,277, filed July 30, 1979, the disclosure of which is expressly incorporated herein by reference. As shown in FIG. 1, lever 30, which preferably is a telescoping lever, is pivotable in a first direction (A) to an approximate vertical position upon actuation of an associated motor and moves belts 16 and 24 forward and upward as it pivots and telescopes. Pivotal movement of lever 30 causes arm rest 32 to pivot in the opposite direction.

Figure 2:
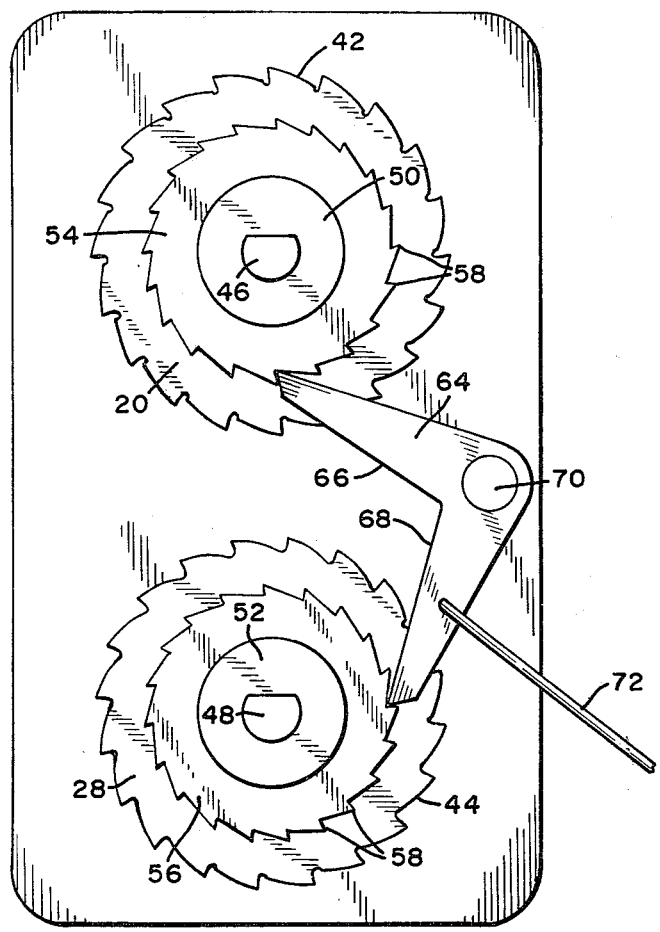
FIG. 2 is a view of the dampening means and retractor housing shown in FIG. 1.
Figure 3:
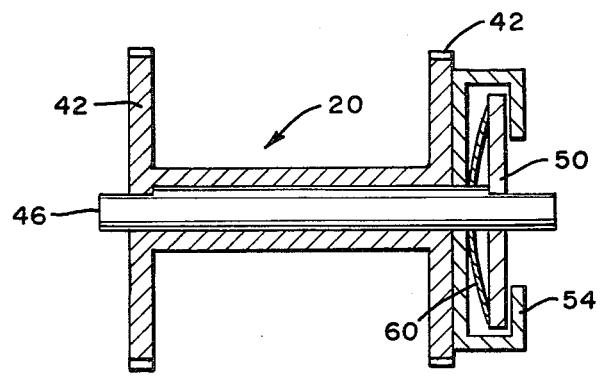
FIG. 3 is a cross-sectional view of one of the retractors including the dampening means of this invention.

As shown in FIG. 2, retractors 20 and 28 are housed in a single housing 40. Each retractor includes at least one ratchet wheel 42, 44 which is mounted on shaft 46, 48 of retractors 20, 28, respectively. Locking pawls for retractors 20, 28 and rewind springs are not shown in the drawings. A friction clutch arrangement is associated with each retractor to provide the necessary dampening effect. Mounted on shafts 46, 48 for rotation therewith on the outside of housing 40 are friction wheels 50, 52 contained within free-wheeling gears 54, 56 which are provided with ratchet teeth 58 along their periphery. Wave springs 60, provide frictional engagement between the friction wheels and the gears. If desired, such gears may be eliminated by providing direct frictional contact between the gears and the friction wheels. A V-shaped pawl 64 having two locking legs 66, 68 associated with gears 54, 56 is pivotally mounted at pivot point 70 on housing 40. Each leg has a distal end which is engageable with ratchet teeth 58. One leg of pawl 64 is connected to one end of a cable 72, the other end of which is connected to a plunger 74 located on the B pillar adjacent to door 12. Plunger 74 is similar to plungers utilized with presently used release devices for retractor comfort mechanisms and is spring biased to the open position. Plunger 74 is adapted to be contacted by the edge of door 12 and compacted when the door is closed.

Movement of plunger 74 inwardly when door 12 is closed causes cable 72 to be moved towards housing 40 so that pawl 64 is moved into engagement with teeth 58. The dampening means is thereby placed into its operable position. When door 12 is opened, plunger 74 is released outwardly by its spring bias and moves cable 72 away from housing 40, thereby pivoting pawl 64 away from teeth 58 to place the dampening means in its inoperable position.

In operation, when the occupant opens door 12 to enter the vehicle, plunger 74 is released, thereby moving the dampening means to its inoperable position. Once the occupant sits in seat 14 and as door 12 is closed, the full rewind force of the rewind springs associated with retractors 20 and 28 takes up excess amounts of webbing associated with belts 16 and 24. The rewind speed of the belts is within a first, relatively high range. Belts 16 and 24 are thus retracted fast enough to avoid the belts from being caught in the door. When door 12 is closed and plunger 74 is retracted, cable 72 moves pawl 64 into engagement with teeth 58 to place the dampening means in its operable position.

When the occupant now moves gear selector 34 out of the park position, hook 38 is rotated downwardly to release belts 16 and 24 for rewinding by retractors 20 and 28 to their occupant-restraining positions. Retractors 20 and 28 now exert a reduced rewind force on the belts due to the effect of the dampening means, whereby the belts are slowly wound up. The speed of rewinding belts 16 and 24 is reduced since gears 42 and 44 are prevented from rotating together with shafts 46 and 48. Frictional engagement of wheels 50 and 52 with gears 42 and 44 through springs 60 create a frictional drag on shafts 46 and 48, thereby reducing the rewind speed to a second range which is lower than the first range of speed. It should be noted that the reduction in the rewind speed is referred to as being in a lower range (as opposed to an absolute speed) since the speed of retraction varies with the amount of webbing extracted and hence the degree of extension of the rewind spring.

As can be seen, the present invention permits the belts to be freely retracted at a relatively slow speed so as to avoid discomfort and injury to the occupant.

It should be noted that movement of pawl 64 into and out of its engaging position with ratchet teeth 58 can be effected in different ways. For example, pawl 64 may be electrically connected to a switch that indicates that the vehicle is ready for locomotion, such as the ignition switch or a switch which senses engine manifold vacuum. In such a case, actuation of the ignition switch would cause pawl 64 to move into engagement with teeth 58 under control of a solenoid, for example. When belts 16 and 24 are released from hook 38, they are retracted under the dampening effect of the friction clutch arrangement. When the ignition switch is turned off, pawl 64 moves away from teeth 58 and the belts are wound up at their normal speed. Also, pawl 64 may be moved into its dampening position in response to movement of gear shift selector 34 out of the park position, or into the drive position, for example, with cable 36 being connected to cable 72.

It is understood that the retractors may be housed separately and that a single legged pawl would then engage the ratchet teeth. Also, a variety of means may be employed to reduce the rewind speed of the webbing when the dampening means is in its operable position. Furthermore, a hook 38 need not be provided to store belts 16 and 24 in their non-interfering positions. For example, the articulation effected by lever 30 and arm rest 32 is sufficient to move the belts away from seat 14. Such device may likewise be actuated by movement of the gear selector, for example, to place the belts into their occupant-restraining positions. In addition, it a single belt may be employed for each seating position.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A vehicle passive seat belt system comprising:
   seat belt webbing adapted to be automatically positioned about a vehicle occupant;
   seat belt retractor means connected to said webbing;

rewind means associated with said retractor means and exerting a rewind force on said webbing whereby said webbing is normally taken up by said retractor at a rewind speed within a first range;

dampening means associated with said rewind means and movable between an operable and an inoperable position, said dampening means being effective in its operable position to cause said webbing to be taken up by said retractor at a rewind speed within a second range which is lower than said first range, said dampening means being ineffective in its inoperable position to reduce the rewind speed of said webbing; and actuator means effective to move said dampening means to its operable position in response to closing of a door of said vehicle or to a condition indicating that said vehicle is operable for locomotion.

2. The vehicle passive seat belt system of claim 1 wherein said dampening means comprises a friction clutch means.

3. The vehicle passive seat belt system of claim 2 wherein said retractor means includes a shaft upon which said webbing is wound, said friction clutch means comprising a friction wheel rotatable with said shaft and a free-wheeling gear rotatable on said shaft and being in frictional engagement with said friction wheel, and pawl means engageable with said gear.

4. The vehicle passive seat belt system of claim 3 including ratchet teeth on the periphery of said gear, a housing for said retractor means, said pawl means being pivotably mounted on said housing for movement into and out of engagement with said ratchet teeth whereby said dampening means is moved into its operable and inoperable positions, respectively.

5. The vehicle passive seat belt system of claim 4 including separate lap and shoulder belt retractors mounted in said housing, friction clutch means associated with each of said retractors, and said pawl means being engageable with each of said friction clutch means.

6. The vehicle passive seat belt system of claim 5 including cable means connecting said actuator means and said pawl means.

7. The vehicle passive seat belt system of claim 1 including means operable to maintain said webbing in a non-restraining position and to release said webbing for movement under control of said dampening means to a restraining position in response to a condition indicating that said vehicle is operable for locomotion.

8. The vehicle passive seat belt system of claim 7 wherein said means for maintaining said webbing in a non-restraining position comprises hook means.

9. The vehicle passive seat belt system of claim 7 including cable means connecting said actuator means and said dampening means.

10. The vehicle passive seat belt system of claim 7 wherein said actuator means is effective in response to closing of a door of said vehicle.

* * * * *